United States Patent [19]

Chang

[11] Patent Number: 5,041,813
[45] Date of Patent: Aug. 20, 1991

[54] "AUTOMOBILE DISABLED" SIGN

[76] Inventor: Jih-Cheng Chang, 3Fl., No. 4, Lane 244, Hsing Lung Road, Sec. 2, Chin Mei, Taipei, Taiwan

[21] Appl. No.: 536,153

[22] Filed: Jun. 7, 1990

[30] Foreign Application Priority Data

Jan. 25, 1990 [TW] Taiwan ................. 79201082

[51] Int. Cl.$^5$ .............................. B60Q 1/52
[52] U.S. Cl. .................... 340/472; 340/475; 340/479
[58] Field of Search .......... 340/471, 472, 473, 487, 340/489, 475, 479; 362/66, 61; 116/63 T; 40/591, 593, 903

[56] References Cited

U.S. PATENT DOCUMENTS

| 4,825,191 | 4/1989 | Ching-Hwei | 340/472 |
| 4,833,448 | 5/1989 | Chang | 340/425.54 |
| 4,835,515 | 5/1989 | McDermott et al. | 340/472 |

FOREIGN PATENT DOCUMENTS 2836767 9/1979 Fed. Rep. of Germany .
221735 12/1983 Japan .

Primary Examiner—Donnie L. Crosland
Assistant Examiner—Jeffery A. Hofsass
Attorney, Agent, or Firm—Leonard Bloom

[57] ABSTRACT

A collapsible, triangular frame is placed on the back side of an automobile to be used as a "disabled" sign when the automobile breaks down. The triangular frame is composed of a base member and two side members rotatably connected to two ends of the base member. A driving device operable by a control device is provided onto the base member to operate the two side members from a horizontal position to an erected position, and from the erected position to the horizontal position, as desired. The triangular frame is provided with signal lights which are turned on when the triangular frame is erected, and are turned off when it is collapsed to the horizontal position.

1 Claim, 7 Drawing Sheets

"AUTOMOBILE DISABLED" SIGN

BACKGROUND OF THE INVENTION

When an automobile is disabled (i.e., breaks down) on the road, traffic regulations require that the automobile be pulled to the road side and a disabled sign such as a triangular frame be placed behind the automobile. However, if the breakdown occurs on a highway where traffic is busy, it is dangerous for the driver to get out of his car and to hang the disabled sign on the rear end of the car. Moreover, in the case of such sudden breakdowns as an engine failure or a flat tire while travelling, there has not been an appropriate way to alert the drivers of cars following behind. Therefore, it is the main object of this invention to propose an automobile disabled sign which can be erected with an electrical control device by the driver who can remain within the automobile.

SUMMARY OF THE INVENTION

The automobile disabled sign of this invention is composed of a triangular frame which can be collapsed and erected by an electrical control device. The triangular frame has a base member and two side members, each one of which has one end rotatably connected to one end of the base member. A driving device is provided onto the base member to move each side member in such a manner that when the driving device is operated in one way, the side members are caused to rotate upward and inward from a horizontal position with respect to the respective ends of the base member until the free ends of the side members meet each other to form a triangular frame, and and when the driving device is operated in another way, the side members are caused to rotate outward and downward from an erected position until they align with the base member to form a straight bar. The driving device is electrically controlled by an electrical control device which can be operated by the driver who can remain within the automobile. The triangular frame is conveniently mounted onto the rear end of the automobile, to be visible by drivers of cars following behind.

DETAILED DESCRIPTION OF THE INVENTION

Figure 1:
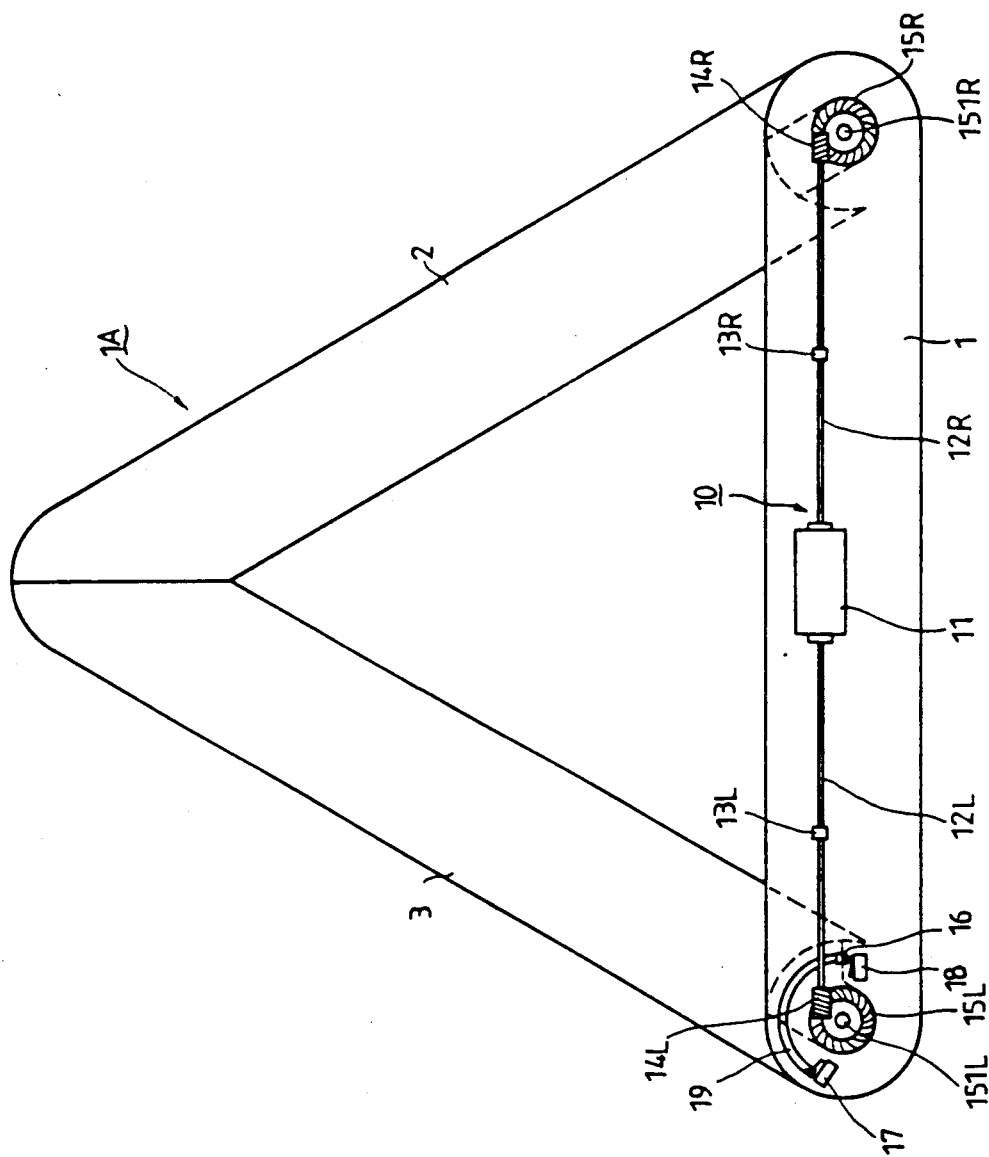
FIG. 1 is a rear view of a first embodiment of the automobile disabled sign of the present invention, with the electrical control device omitted from the drawing.
Figure 2:
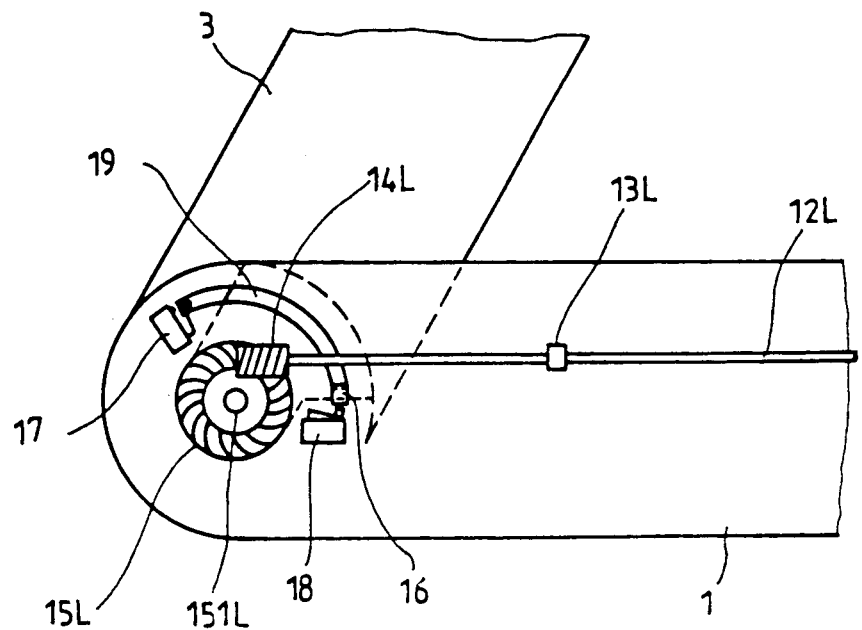
FIG. 2 is a fragmentary rear view of the automobile disabled sign of FIG. 1, showing the arrangement of the joint of the left side member and the base member, with the left side member in the erected position.
Figure 3:
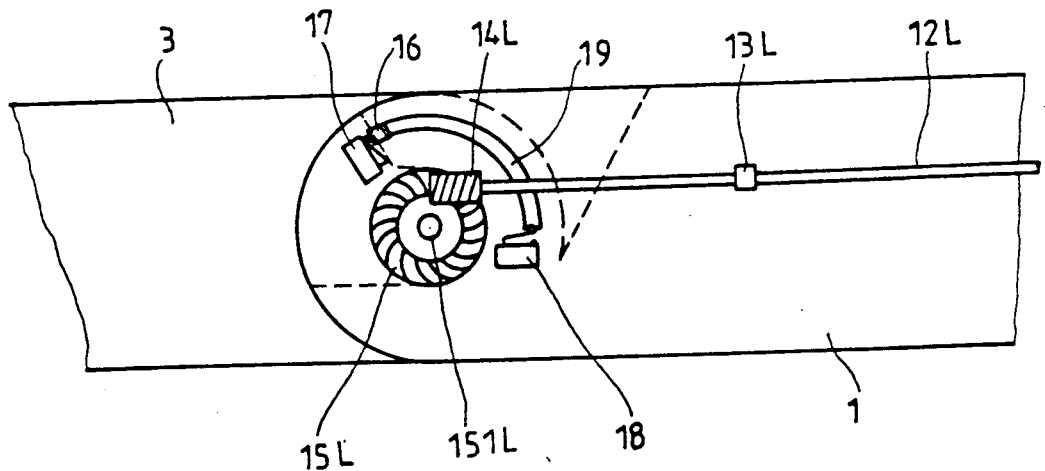
FIG. 3 is a fragmentary rear view of the automobile disabled sign of FIG. 1, showing the arrangement of the joint of the left side member and the base member, with the left side member collapsed and folded down to a horizontal position.

FIG. 1 shows a first embodiment of the automobile disabled sign of this invention, which includes a triangular frame 1A, a driving device 10, and an electrical control device, not shown. Triangular frame 1A is composed of a base member 1, a right side member 2 having a lower end rotatably connected to the right end of base member 1 by an axle 151R, and a left side member 3 having a lower end rotatably connected to the left end of base member 1 by another axle 151L. The lower end of left side member 2, as shown in FIGS. 1, 2 and 3, is provided with a stud 16 which extends through an arc shaped slot 19 having an arc with respect to axle 151L as a center axis of the arc, so that when left side member 3 pivots with respect to the center axis of axle 151L, stud 16 moves along arc shaped slot 19.

Driving device 10 includes an electric motor 11 mounted onto the rear side of base member 1, elongated drive shafts 12R and 12L extending from two sides of electric motor 11, worm gears 14R and 14L fixedly provided at the free end of respective drive shafts 12R and 12L, and worm wheels 15R and 15L engaged with respective worm gears 14R and 14L. Each one of worm wheels 15R and 15L is fixedly mounted on to the respective axle 151R or 151L which is fixedly connected to the lower end of respective side members 2 or 3.

Drive shafts 12R and 12L are respectively supported by bearings 13R and 13L.

At two end portions of arc shaped slot 19 are provided a first limit switch 17 and a second limit switch 18 to be explained later.

Electric motor 11 is a DC motor and is controlled by an electrical control device to be described later.

When electric motor 11 is energized to rotate in a predetermined direction while two side members 2 and 3 are in an erected position as shown in FIGS. 1 and 2, worm wheels 151R and 151L are caused to rotate respectively in such direction that right side member 2 is caused to rotate clockwise with respect to axle 151R, and left side member 3 is caused to rotate counter-clockwise with respect to axle 151L. In other words, two side members 2 and 3 are folded outwardly. Stud 16 is caused to move along arc shaped slot 19, until left side member 3 reaches to a horizontal position to align with base member 1 as shown in FIG. 3, where stud 16 comes in contact with first limit switch 17 to operate first limit switch 17 which in turn operates the electrical control device to stop electric motor 11. At this state right side member 2 is also at a horizontal position, not shown.

When electric motor 11 is energized to rotate in a reversed direction while the two side members 2 and 3 are in a horizontal position (FIG. 3), right side member 2 not shown is caused to rotate counter-clockwise, and left side member 3 is caused to rotate clockwise, and stud 16 is caused to move along arc shaped slot 19. As soon as the free ends of the two side members meet with each other and the the triangular frame is erected as shown in FIG. 1, stud 16 comes in contact with second limit switch 18 to operate second limit switch 18, and electric motor 11 is caused to stop.

Figure 4:
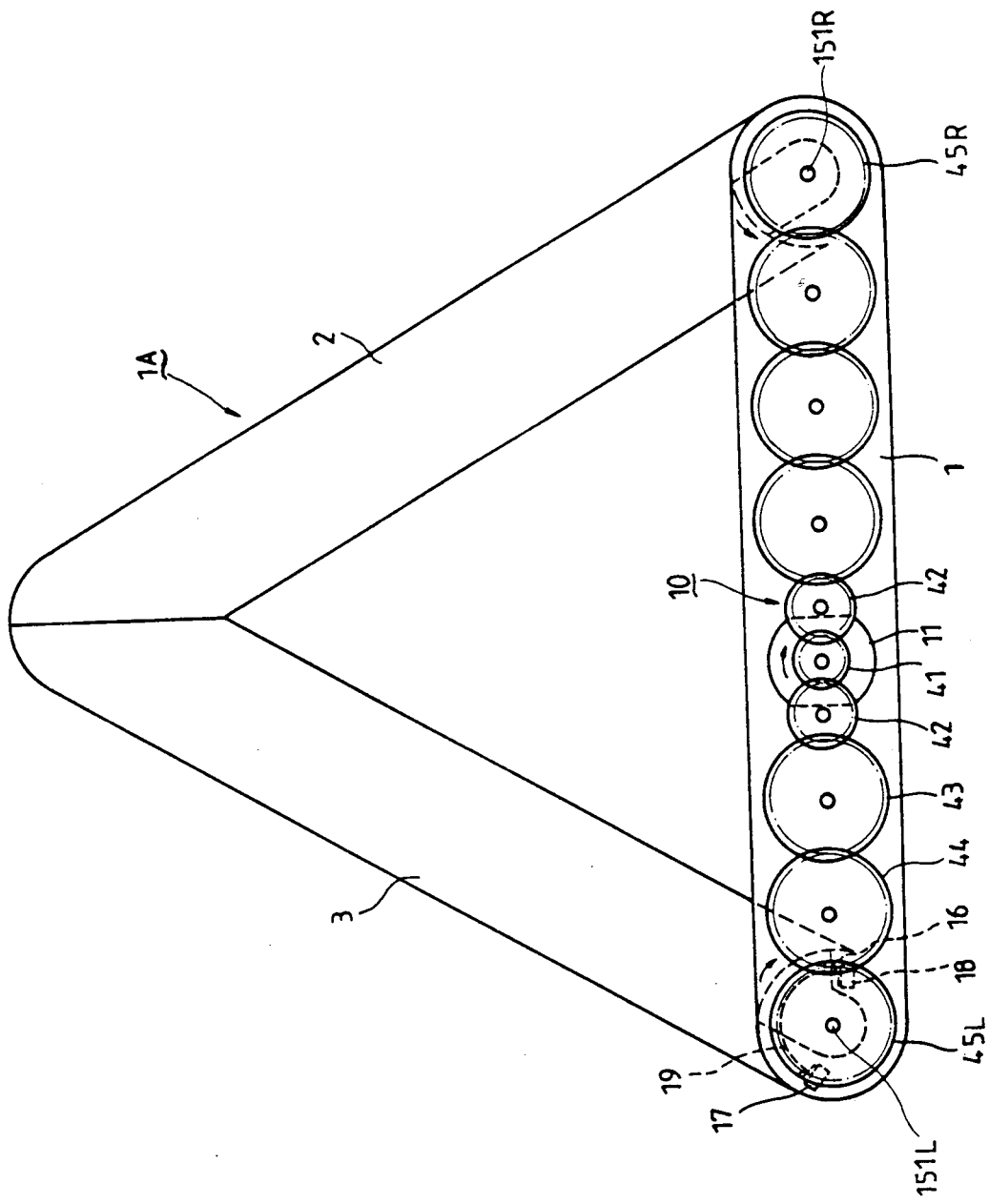
FIG. 4 is a schematic rear view of a second embodiment of the automobile disabled sign of the present invention, with the electrical control device omitted from the drawings.

FIG. 4 shows a second embodiment of the automobile disabled sign of this invention, which includes a triangular frame 1A, a driving device 10, and an electrical control device, not shown. Triangular frame 1A is composed of a right side member 2, a left side member 3, and a base member 1 arranged in the same manner as the first embodiment. Driving device 10 includes an electric motor 11 fixedly mounted on one side of base member 1, electric motor 11 having an output shaft provided with an output pinion 41. Driving device 10 also includes a right driving gear 45R fixedly mounted onto axle 151R which is fixedly connected to the lower end of right side member 2, and a left driving gear 45L fixedly mounted onto axle 151L which is fixedly connected to the lower end of left side member 3. A series of gear train including idle gears 42, 43, and 44 is provided between output pinion 41 and left driving gear 45L to transmit the rotary power from elecric motor 11 to left driving gear 45L in such a manner that left driving gear 45L is caused to rotate in the same direction as pinion 41 rotates. Another series of gear train is provided between output pinion 41 and right driving gear 45R in such a manner to cause right driving gear 45R to rotate in an opposite direction, so that right side member 2 and left side member 3 move synchronously in opposite directions when electric motor 11 is caused to rotate. Base member 1 has an arc shaped slot 19, and limit switches 17 and 18; left side member 3 has a stud 16; they are arranged in the same manner as that of the first embodiment.

Triangular frame 1A of the second embodiment is erected and folded to collapse in the same manner as in the case of the first embodiment.

Figure 5:
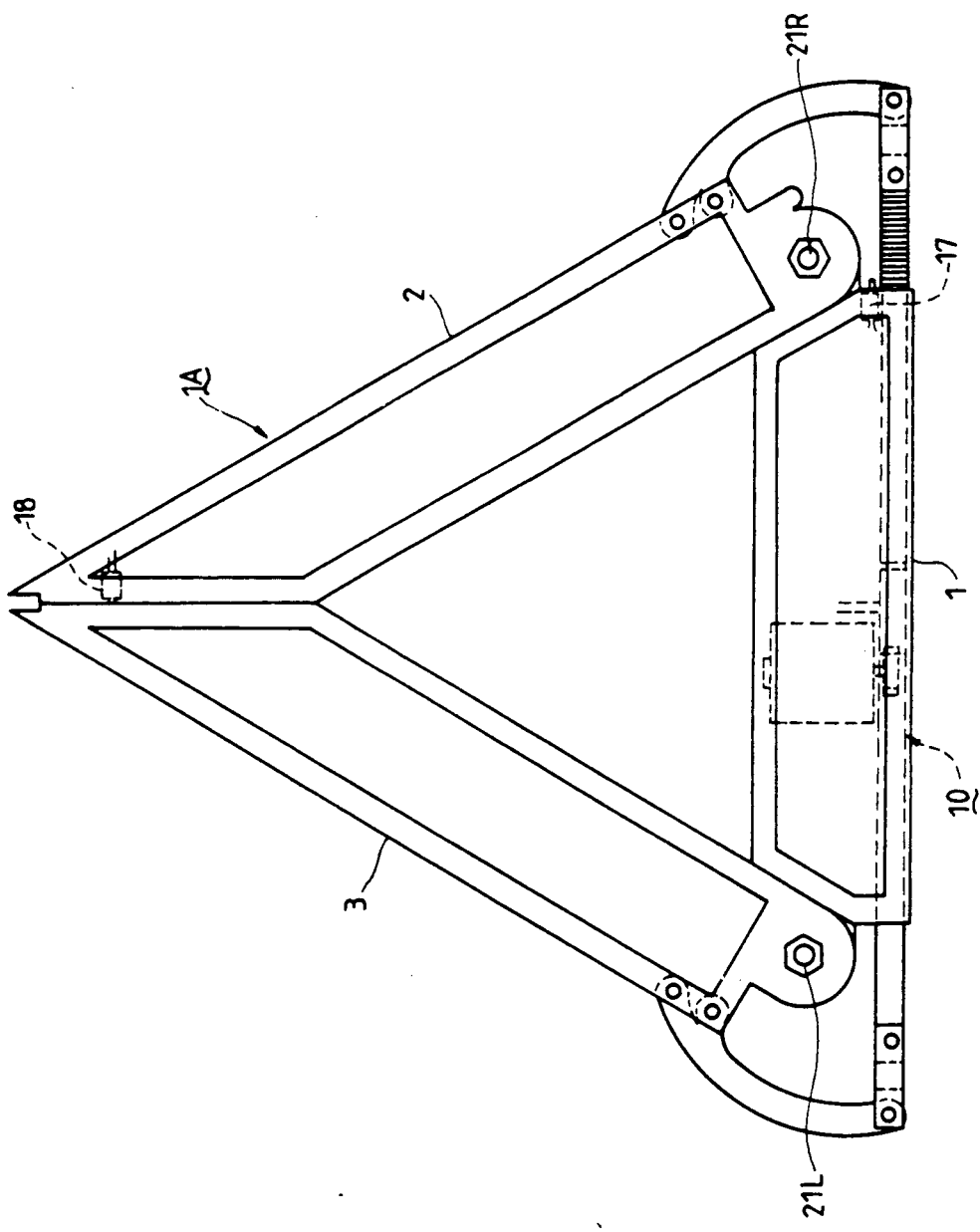
FIG. 5 is a schematic rear view of a third embodiment of the automobile disabled sign of the present invention, showing the erected state.
Figure 6:
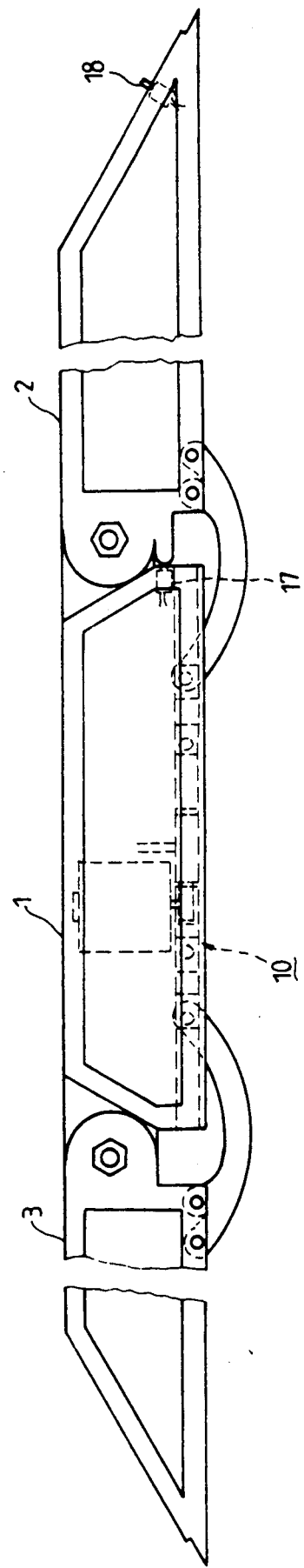
FIG. 6 is a schematic rear view of the third embodiment of the automobile disabled sign, showing the state when the side members are collapsed and folded down to the horizontal position.
Figure 7:
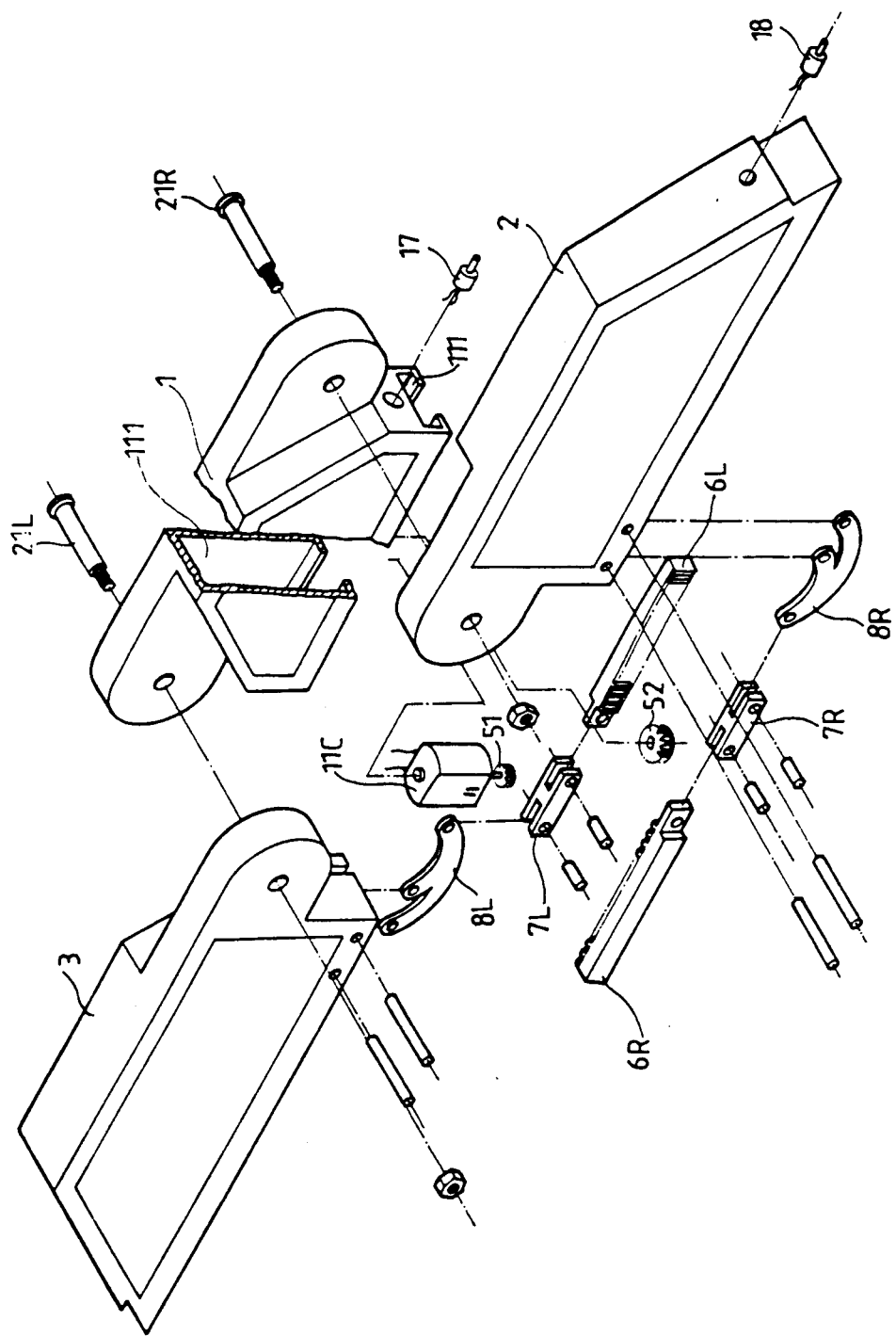
FIG. 7 is a perspective, exploded view of the automobile disabled sign of FIG. 6, showing the arrangement of the driving device.

FIGS. 5-7 show a third embodiment of the automobile disabled sign of this invention, which includes a triangular frame 1A, a driving device 10, and an electrical control device, not shown.

Triangular frame 1A includes a base member 1, a right side member 2 having a lower end rotatably connected with the right end of base member 1 by a bolt 21R, and a left side member 3 having a lower end rotatably conected with the left end of base member 1 by another bolt 21L.

Base member 1, as shown in FIG. 7, has a generally inverted-U shaped cross section to provide a compartment 111 for accommodating driving device 10.

Driving device 10 includes an electric motor 11 fixedly mounted in compartment 111 of base member 1, a pair of racks 6R and 6L, each one of racks 6R and 6L having one end connected with a side part of respective side member 2 or 3 through respective first link 7R or 7L, and second link 8R or 8L. Electric motor 11 has an output shaft provided with an output pinion 51 for driving a driving gear 52 which engages with pairs of racks 6R and 6L.

First link 7R has one end pivotally connected to rack 4R, and another end pivotally connected to one end of second link 8R, and second link 8R has another end fixedly connected to a side part of the lower end of right side member 2.

Another first link 7L and another second link 8L are connected, in the same manner as above, between rack 6L and left side member 3.

A first limit switch 17 is provided on the right end of base member 1 to be operated by the lower part of right side member 2, and a second limit switch 18 is provided on an upper part of right side member 2 to be operated by an upper part of left side member 3.

Racks 6R and 6L are arranged oppositely parallel to each other and disposed to engage with the opposite sides of driving gear 52, so that when electric motor 11 is caused to rotate in one direction (ERECT), racks 6R and 6L are cause to move in an outward direction to push the side part of the lower part of respective side members 2 and 3, to erect the frame, and when electric motor 11 is caused to rotate in an opposite dirction (COLLAPSE AND FOLD), racks 6R and 6L are cause to move in an opposite, inward direction to pull the side part of the lower part of side members 2 and 3, to collapse and fold the frame.

First limit switch 17 is operated to stop motor 11 when side members 2 and 3 are rotated to a horizontal position. Second limit switch 18 is operated to stop motor 11 when side members 2 and 3 have been rotated upward to erect the frame.

Figure 8:
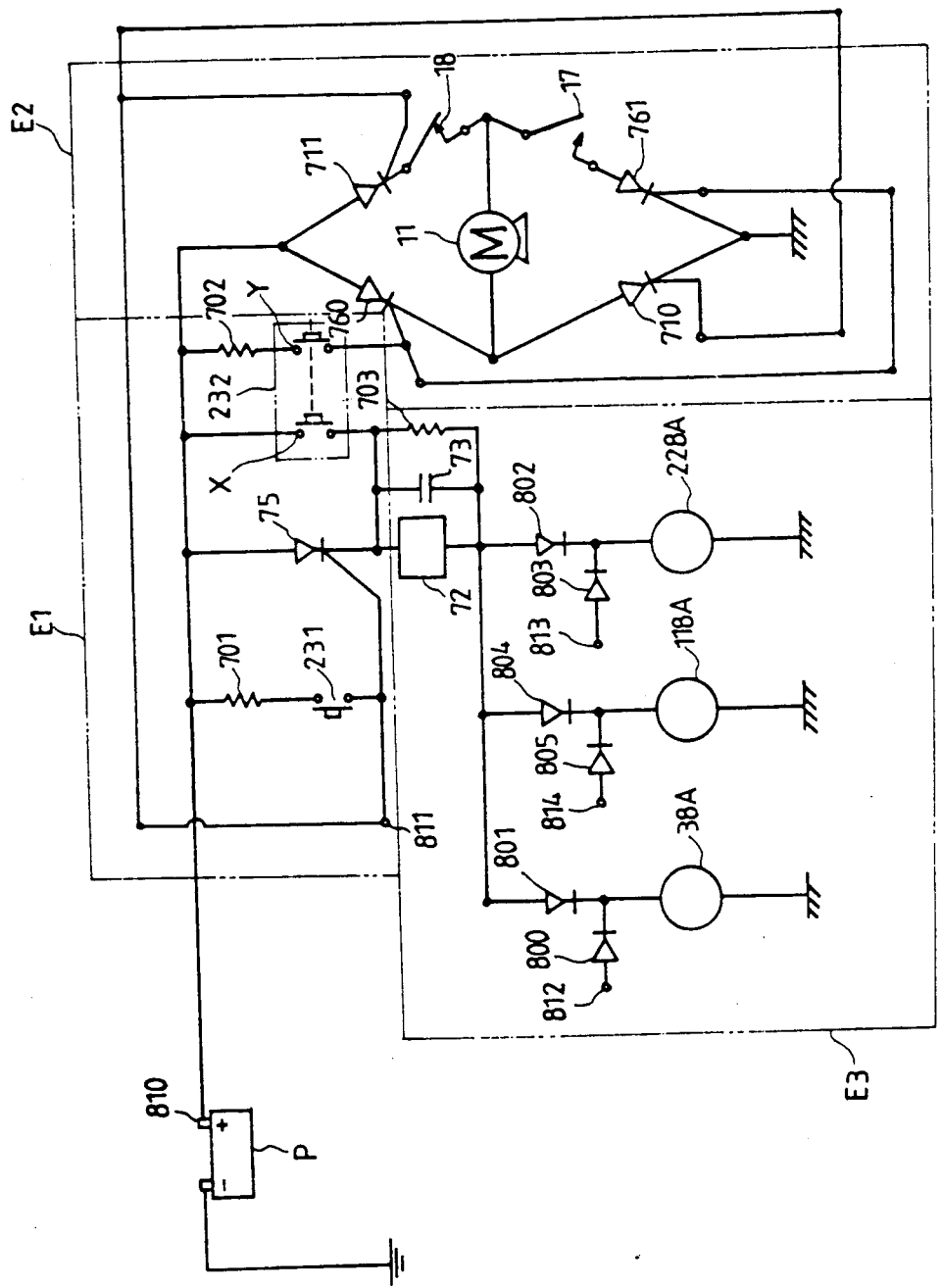
FIG. 8 is a electrical circuit diagram of the electrical control device employed in the automobile disabled sign of this invention.

FIG. 8 shows an electric circuit diagram of the electrical control device employed in the automobile disabled sign of this invention. The electrical control device includes a switching unit E1, a motor operating unit E2 controlled by switching unit E1, and a signal unit E3 also controlled by switching unit E1.

Switching unit E1 includes a fist switch 231, first SCR (Silicon Controlled Rectifier) 75, and a second switch 232 having two pairs of contact points X and Y.

First SCR 75 has an anode connected to a positive terminal 810 of power source P which may be a battery having a negative terminal connected to ground, a cathode connected to signal unit E3, and a gate connected to the same terminal 810 through first switch 231 and resistor 701. The pair of contact points X is shunted accross the anode and cathode of first SCR 75 while another pair Y of contacts connects gates of SCR 760 and SCR 761 of motor operating unit E2 to the same terminal 810 of power source P through resistor 702.

Motor operating unit E2 includes a bridge circuit formed by a first series connection of SCRs 760 and 710, and a second series connection of SCRs 711, second limit switch 18, first limit switch 17, and SCR 761; the first and second series connections are connected in parallel between the terminal 810 of power source P and ground. Electric motor 11 is connected between the junction of SCR 760 and SCR 710, and the junction of second limit switch 18 and first limit switch 17.

Each one of SCR 710 and SCR 711 has a gate connected to terminal 810 of power source P through first switch 231 and a resistor 701, while each one of SCR 760 and SCR 761 has a gate connected to terminal 810 of power source P through pair of contact points Y of second switch 232 and resistor 702.

Signal unit E3 includes a blinker 72, a first signal circuit formed by a series connection of a first diode 801 and a first signal light 38A, a second signal circuit formed by a series connection of second diode 804 and a second signal light 118A, and a third signal circuit formed by a series connection of a third diode 802 and a third signal light 228A. The first, second, and third signal circuits are connected in parallel between one end of blinker 72 and ground, blinker 72 having another end connected to the cathode of first SCR 75. Blinker 72 is provided with a capacitor 73 and a resister 703 both shunted across the two ends of blinker 72.

First signal light 38A, second signal light 118A, and third signal 228A are conveniently mounted, respectively, onto the left side member 3, the base member 1, and the right side member 2 of the triangular frame 1A of the automobile disabled sign of this invention.

First signal light 38A, second signal light 118A and third signal light 228 may, as an option, also be respectively connected to left turn signal lights 812 of the car through a fourth diode 800, brake lights 814 of the car through a fifth diode 805, and right turn signal lights 813 of the car through a sixth diode 803, so that when triangular frame 1A is collapsed and folded into an elongated bar shape, the first and third signal lights 38A and 228A can be operated in cooperation with the turn signal lights of the automobile, and the second signal light 118A can be operated in cooperation with the brake lights. Diodes 800, 805, and 803 prevent the turn signals lights and the brake lights of the automobile from being turned on by switching unit E1 when the triangular frame 1A is erected and used as a warning sign.

First switch 231 and second switch 232 are normally open, and first limit switch 17 and second limit switch 18 are normally closed.

The operation of the electrical control device of FIG. 8 will now be described as follows.

When triangular frame 1A is not in use to show the disabledment breakdown of the automobile, it is collapsed and folded into an elongated bar shape, and first limit switch 17 is turned off (in an open position, as shown in FIG. 8.)

When the driver wants to erect the triangular frame, he presses first switch 231 to close first switch for a short intance. Then voltage is applied to the gates of SCRs 75, 710, and 711, to activate SCRs 75, 710, and 711, to become conductive, and then the following events occur at the same time:

1. Electric power is supplied to first signal light 38A, second signal light 118A, and third signal light 228A through blinker 72, causing these lights to blink;
2. Electric power is supplied to electric motor 11 through SCR 711, second limit switch 18, and SCR 710, causing electric motor 11 to rotate in a predetermined (ERECT) direction, causing the two side members to rotate upwards; and
3. First limit switch 17 is released and allowed to close (turn on) while SCR 760 and SCR 761 remain non-activated and thus non-conductive.

As soon as the two side members come to an erected position, second limit switch 18 is pressed and caused to open (turn off). The electric power supplied to motor 11 is thus cut off and the rotation of motor 11 is stopped. SCRs 710 and 711 become non-conductive.

When the driver wants to collapse and fold the triangular frame into an elongted bar shape, he presses second switch 232 to close second switch for a short instance. Then the following events occur at the same time; 1. First SCR 75 become non-conductive as the pair of contacts X of second switch 232 is closed for a short instance to apply a by-passed voltage to the cathode of SCR 75, and thus signal lights 38A, 118A, and 228A are turned off; and 2. A voltage is applied to the gates of SCRs 760 and 761, causing SCRs 760 and 761 to become activated and conductive, and electric power is supplied in a reversed direction to motor 11 through SCR 760, first limit switch 17 which has been closed, and SCR 761; electric motor 11 is thus caused to rotate in a reversed direction (COLLAPSE AND FOLD), to cause the two side members of the triangular frame to rotate downwards. Second limit switch 18 is released and allowed to close, while SCR 710 and SCR 711 remain non-conductive.

As soon as the two side members of the triangular frame move to a horizontal position, first limit switch 17 is pressed and caused to turn off. The supply of electric power to motor 11 is thus cut off and the rotation of motor 11 is stopped.

The provision of first to sixth diodes 801, 804, 802, 800, 805, and 803 allow signal lights 38A, 118A, and 228A to be turned on while the triangular frame is not erected and when their corresponding turn signals and brakes of automobile 812, 814, and 813 are turned on, so that signal lights 38A, 118A, and 228A can also be used as regular turn signal lights and brake light when they are not used as disabled signs. However, fourth to sixth diodes 800, 805, and 803 prevent turn signal lights 812 and 813, and brake light 814 of the automobile from being turned on by switching unit E1 when the triangular frame 1A is erected and used as a diabled sign with signal light 38A, 118A and 228A being turned on.

Though preferred embodiments of the automobile disabled sign of this invention have been illustrated and described as above, it is to be understood that modifications are possible, such that the two side members and the driving device can be arranged to fold the two side members inwardly, or to fold one of the two inwardly and another outwardly, without departing from the spirit and scope of this invention defined by the appended claims.

What is claimed is:

1. An automobile disabled sign, comprising:
    a collapsible frame including a base member, a first side member having one end rotatably connected to one end of said base member, and a second side member having one end rotatably connected to the other end of said base member;
    a driving device provided on said base member for moving said first member and said second member from a horizontal position to an erected position, and from an erected position to a horizontal position;
    an electrical control device for controlling said driving device, said electrical control device including switching means;
    said first side member being provided with a first signal light operatively connected to one turn signal light of the automobile;
    said second side member being provided with a second signal light operatively connected to the other turn signal light of the automobile;
    said base member being provided with a third signal light operatively connected to the brake light of the automobile;
    said first, second, and third signal lights being turned on by said switching means when said first side member and said second side member are being moved to said erected position, and turned off by said switching means when said first side member and said second side member are being moved to said horizontal position; and
    diode means to allow said first, second, and third signal lights to turn on when said first side member and said second side member are in said horizontal position and when the turn signal lights and brake lights of said automobile are turned on; said diode means being adapted to prevent the turn signal lights and the brake lights of the automobile from being turned on by said switching means when said switching means is operated to move said first side member and said second side member to said erected position and to turn on said first, second, and third signal lights.

* * * * *